United States Patent [19]
Dowling et al.

[11] Patent Number: 5,895,463
[45] Date of Patent: Apr. 20, 1999

[54] COMPRESSION OF GROUPED DATA

[75] Inventors: William F. Dowling, Philadelphia; Anatoly Kotlarsky, Holland, both of Pa.

[73] Assignee: Franklin Electronic Publishers, Incorporated, Burlington, N.J.

[21] Appl. No.: 08/859,022

[22] Filed: May 20, 1997

[51] Int. Cl.⁶ ................................ G06F 17/30
[52] U.S. Cl. ................. 707/3; 707/1; 707/101
[58] Field of Search ..................... 707/1, 3, 101

[56] References Cited

U.S. PATENT DOCUMENTS

| | | | |
|---|---|---|---|
| 4,843,589 | 6/1989 | Yoshida et al. | 704/2 |
| 5,383,121 | 1/1995 | Letkeman | 704/10 |
| 5,706,493 | 1/1998 | Sheppard, II | 707/1 |
| 5,752,242 | 5/1998 | Havens | 707/3 |
| 5,765,170 | 6/1998 | Morikawa | 707/200 |

OTHER PUBLICATIONS

Witten et al., Models for compression in full-text retrieval system, 1991 IEEE, Data Compression, a991 Conference, pp. 23-32.

*Primary Examiner*—Wayne Amsbury
*Assistant Examiner*—Shahid Alam
*Attorney, Agent, or Firm*—McAulay Nissen Goldberg Kiel & Hand, LLP

[57] ABSTRACT

An electronic reference device provides the ability to access all members of any one of a plurality of groups of data items in response to a user input of any one member of the group being accessed. The reference device includes a memory having a data item list, a token uniquely identifying each member of the data item list, and a plurality of groups of the data item list. Certain members of said data item list being a member of one or more of the groups and certain members of the data item list being a member of none of the groups. An ordered search list consists of each member of the data item list which is a member of at least one of the groups. A delta value is associated with each member of the ordered search list. The sum of the delta values up through any one of the members of the ordered search list provides the value of the token for the corresponding member of the data item list. Each member of the search list has a next-entry pointer identifying another member of the search list. All members of the search list that are linked by a set of inter-connecting next-entry pointers correspond to members of the data item list from the same one of the groups.

44 Claims, 4 Drawing Sheets

COMPRESSION OF GROUPED DATA

BACKGROUND OF THE INVENTION

This invention relates to an electronic reference product providing the ability to search for all members of a common group.

Electronic computers have long been found useful for the storage of large amounts of data and rapid retrieval of portions of the data. Designers of computer hardware and software are continuously challenged to extract higher performance from available computing resources. For applications involving data storage and retrieval, higher performance entails the ability to store greater amounts of data and to retrieve the data in less time. It is particularly challenging to obtain higher performance from the limited computing resources available in a hand-held electronic reference product.

One type of feature useful in an electronic reference product is the storage and retrieval of grouped data items. For example, lexical words (e.g., English words, French words, etc.) are data items which can be grouped according to their ending sounds in a rhyming dictionary, or according to their definitions in a thesaurus. In an electronic reference product, it is desirable for the user to have the capability to enter one word, and for the product to retrieve and display all other words belonging to the same group. Thus, in an electronic rhyming dictionary, when the word "base" is entered, the product retrieves "trace," "airspace," "showcase," and all other words in the electronic database which rhyme with "base."

The number of words that can be stored in the database of the electronic product is limited by the size of the product's memory, and the search speed is limited by the processing speed of the product.

OBJECTS OF THE INVENTION

It is an object of the invention to provide an electronic reference product which provides the ability to access all members of any one of a plurality of groups in response to user input of any one member of a group.

It is a further object of the invention to provide such a reference product wherein the product's memory space is conserved through data compression.

It is an additional object of the invention to provide such a reference product having a high search speed.

Another object of the present invention is to provide a method of storing grouped data in an electronic memory.

These and other objects of the present invention will be apparent from the drawings and detailed descriptions herein.

SUMMARY OF THE INVENTION

An electronic reference device according to the present invention provides the ability to access all members of any one of a plurality of groups of data items in response to a user input of any one member of the group being accessed. The reference device includes a memory having a data item list, with a token value uniquely identifying each member of the data item list. There are a plurality of groups in the data item list. Certain members of the data item list are a member of one or more of the groups. In one embodiment, of the invention, certain members of the data item list are a member of none of the groups. The reference device further includes an ordered search list, which consists of each member of the data item list which is a member of at least one of the groups. A delta value is associated with each member of the ordered search list. The delta values are chosen such that the sum of the delta values up through any one of the members of the ordered search list provides the value of the token for the corresponding member of the data item list. Each member of the search list has a next-entry pointer identifying another member of the search list, such that each member of the search list is identified by one and only one net-entry pointer. All members of the search list that are linked by a set of inter-connecting next-entry pointers correspond to members of the data item list from the same one of the groups.

Certain members of the data item list may be a member of multiple ones of the groups. Each member of the data item list that is a member of multiple groups is listed only once in the data item list and has a single token. Each item that is a member of multiple groups is represented by a number of consecutive entries in the search list equal to the number of groups of which the item is a member. The ones of those consecutive entries in said search list which correspond to a single item on the item list constitute a common set on the search list. The first member of any one of the common sets has a delta value appropriate to the corresponding member of the data item list; the rest of the members of that common set have a delta value of zero.

Certain members of the data item list are not members of any of the groups. Each member of the data item list that is not a member of any of the groups is unrepresented in the search list.

In another conceptualization of the present invention, an electronic reference product for accessing linked data comprises a data item memory which stores a plurality of data items. The data item memory associates each of the data items with a unique token value. A search list memory is also provided, which includes a plurality of ordered search list entries. Each search list entry has a token value associated therewith. The order of the search list entries is the same as the order of the respective associated token values. Each search list entry has a next-entry pointer identifying a linked search list entry. Each of the token values associated with a search list entry is equal to a token value of a corresponding data item. A plurality of the search list entries include a delta value. The delta value is the difference between the value of the associated token and the value of the token associated with the preceding data entry. At least one base value is provided. Each base value stores a token value corresponding to a search list entry. The reference product includes componentry for accessing the data item memory to determine a search token associated with a data item input by a user, and for searching the search list to find a matching search list entry corresponding to the search token. The electronic reference product further includes means for accessing the search list to find a linked search list entry identified by the next-entry pointer of the matching search list entry, and means for accessing the search list to calculate a linked token value associated with the linked search list entry. Means are also provided for accessing the data item memory to determine a linked data item associated with the linked token value and for displaying the linked data item.

Each search list entry is a member of a sublist. Members of a common sublist are linked by the next-entry pointers of their respective members. Each data item which corresponds to a search list entry is a member of a group, and each sublist is associated with a group. Each member of a group has a corresponding search list entry in the associated sublist.

Each data item can be, for example, a lexical word. In that case, each group may be a group of rhyming lexical words or a group of synonyms.

All search list entries which correspond to data items in a common group are preferably linked by the next-entry pointers of the search list entries in a circular fashion.

The number of groups of which each respective data item is a member is equal to the number of search list entries corresponding to the respective data item. Search list entries which correspond to a common data item are adjacent in the search list.

The search list memory may further include at least one group tag entry associated with a tagged sublist. The group tag entry is linked to the tagged sublist by the next-entry pointer of an entry in the tagged sublist. Preferably, the group tag entry and the sublist members in the associated tagged sublist are linked by the next-entry pointers thereof in a circular fashion.

The means for searching the search list preferably includes means for performing a binary search on the search list.

Each base value may be included in the corresponding search list entry. Alternatively, a base value memory is provided for storing each base value.

According to an additional conceptualization of the present invention, an electronic memory is provided for use with an electronic reference product. The electronic memory provides the ability to access all members of any one of a plurality of groups of data items in response to a user input of any one member of the group being accessed. The memory includes a data item memory storing a plurality of data items. The data item memory associates each of the data items with a unique token value. A search list memory includes a plurality of ordered search list entries. Each search list entry has a token value associated therewith. The order of the search list entries is the same as the order of the respective associated token values. Each search list entry has a next-entry pointer identifying a linked search list entry. Each of the token values associated with a search list entry is equal to a token value of a corresponding data item. A plurality of the search list entries include a delta value. The delta value is the difference between the value of the token associated with the preceding search list entry. At least one base value is provided. Each base value stores a token value corresponding to a search list entry. The next-entry pointers are selected such that the data item corresponding to each search list entry is in a common group with the data item corresponding to the respective linked search list entry.

In a further conceptualization of the present invention, an electronic memory is provided for use with an electronic reference product. The memory provides the ability to access all members of any one of a plurality of groups of data items in response to a user input of any one member of the group being accessed. The memory comprises a data item memory storing a plurality of data items. The data item memory associates each of the data items with a unique token value. A search list memory includes a plurality of ordered search list entries. Each search list entry has a token value associated therewith. The order of the search list entries is the same as the order of the respective associated token values. Each search list entry has a next-entry pointer identifying a linked search list entry. Each of the token values associated with a search list entry is equal to a token value of a corresponding data item. A plurality of the search list entries include a delta value. The delta value is the difference between the value of the associated token and the value of the token associated with the preceding search list entry. At least one base value is provided. Each base value stores a token value corresponding to a search list entry. A first program memory is provided for determining a search token associated with a data item input to an electronic reference product by a user. A second program memory is provided for searching the search list to find a matching search list entry corresponding to the search token. A third program memory is provided for accessing the search list to find a linked search list entry identified by the next-entry pointer of the matching search list entry. A fourth program memory is provided for accessing the search list to calculate a linked token value associated with the linked search list entry. A fifth program memory is provided for accessing the data item memory to determine a linked data item associated with the linked token value. A sixth program memory is provided for directing the electronic reference product to display the linked data item.

Each search list entry is a member of a sublist. Members of a common sublist are linked by the next-entry pointers of their respective members. Each data item which corresponds to a search list entry is a member of a group. Each sublist is associated with a group. Each member of a group has a corresponding search list entry in the associated sublist. All search list entries which correspond to data items in a common group are linked by the next-entry pointers of the search list entries in a circular fashion. The number of groups of which each respective data item is a member is equal to the number of search list entries corresponding to the respective data item. Search list entries which correspond to a common data item are adjacent in the search list.

The second program memory for searching the search list preferably includes means for performing a binary search on the search list.

The present invention provides a method of storing grouped data in an electronic memory.

According to the inventive method, a plurality of data items are provided, certain of the data items being a member of one or more groups. A unique token value is assigned to each of the data items. A sublist is generated for each group such that, for each data item in a group, the respective sublist includes a sublist entry associated with the data item. The sublists are merged to generate a search list, such that the search list has a search list entry for each sublist entry, and such that the search list entries are ordered according to the order of the token values of the associated data items. For each search list entry, a next-entry pointer is provided which identifies a linked search list entry, such that the data item corresponding to each search list entry is in a common group with the data item corresponding to the respective linked search list entry. The search list is stored in an electronic memory. The data items may also be stored in the electronic memory.

Where each search list entry includes the associated token value, the associated token value is replaced in a plurality of search list entries with a delta value representing the difference between the associated token value and the token value associated with the preceding search list entry.

DETAILED DESCRIPTION OF THE INVENTION

Figure 1:
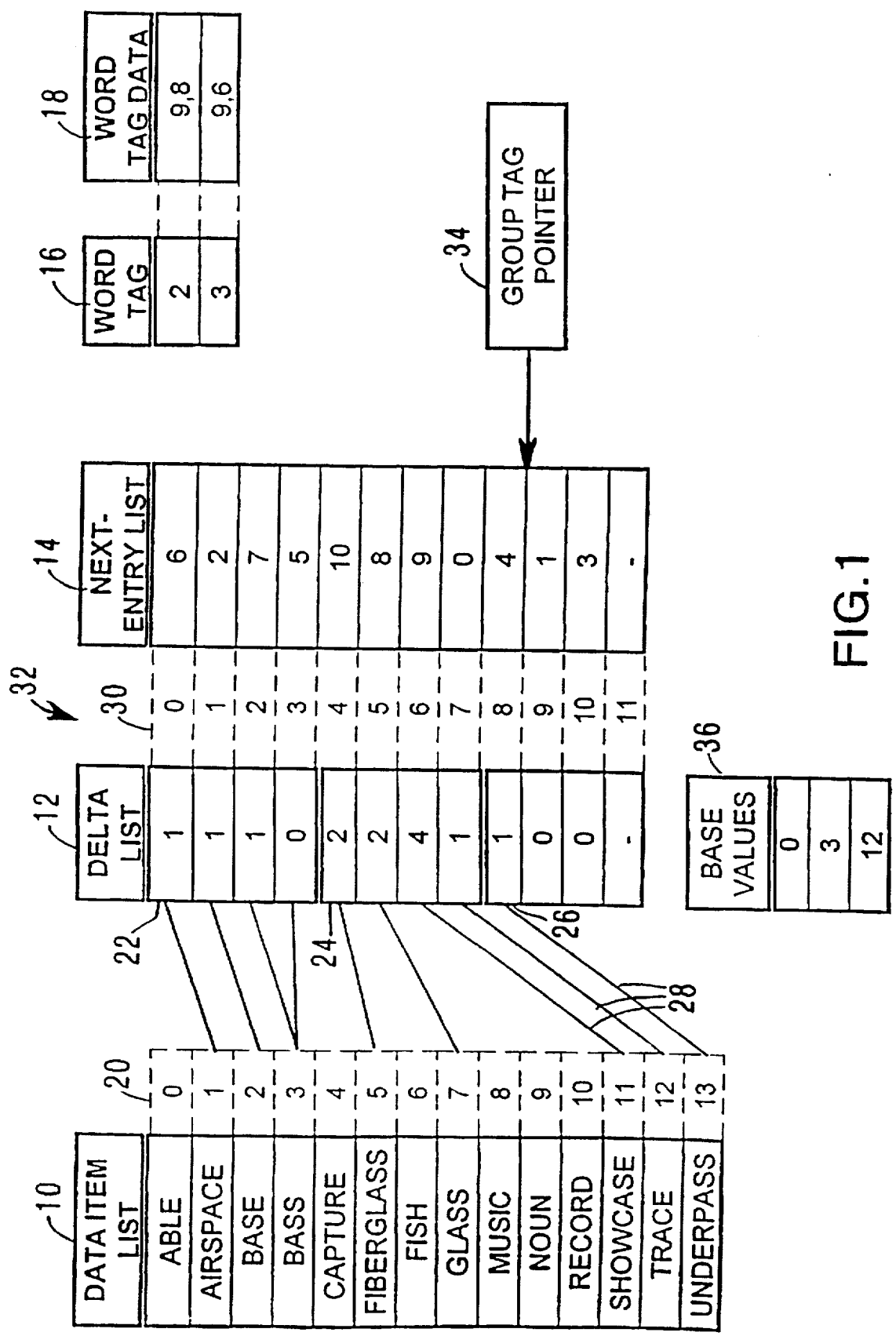
FIG. 1 is a schematic diagram of a memory including a data item list and search list according to the present invention.

Various kinds of data must be stored in the memory of an electronic reference product. Some of the data is used to represent the data items, such as words, which are to be grouped. Additional data is used to organize the words into groups. Data may be provided as "tags" which provide further information on the groups or on the individual words.

In general, the data is organized into a compressed format on a high-speed computer before being stored in the memory of an electronic reference product (i.e., in a removable or non-removable memory for use with an electronic reference product). In that compression process, a group of data items to be organized is selected, such as the following list of lexical words:

| | |
|---|---|
| record | glass |
| able | music |
| airspace | noun |
| base | bass |
| showcase | capture |
| trace | fiberglass |
| underpass | fish |

Each word in the word list is assigned a unique number, called a "token," to identify the word. The words are preferably organized in alphabetical order before being assigned a token number, but such an organization is not in general necessary. One possible enumeration of the words along with their respective token numbers is as follows:

```
0able
1airspace
2base
3bass
4capture
5fiberglass
6fish
7glass
8music
9noun
10record
11showcase
12trace
13underpass
```

There are several "trie" and other types of data compression algorithms which are known for storing words and their token enumeration in a compressed format. The trie method is set forth, for example, in "Data Structures and Algorithms," A. V. Aho, J. E. Hopcroft, and J. T. Ullman (pages 163–169 incorporated herein by reference). In general, the token itself is not stored in the memory, but rather represents the memory location or locations used to store the word. The word list is simply stored in such a way that, given a token value, it is possible to locate a unique word identified by the token value, and conversely, given a word, it is possible to determine the token value corresponding to that word. This condition is satisfied by "trie" compression, as well as by various other compressed and uncompressed arrangements of words.

The item list above is broken down into groups of rhyming words as follows for use in an electronic rhyming dictionary:

Group 1: airspace, base, bass, showcase, trace

Group 2: bass, fiberglass, glass, underpass

It should be noted that the word "bass" appears in both groups corresponding to the two pronunciations thereof. "Bass" the musical term, rhymes with "space," while "bass" the fish rhymes with "glass." Furthermore, some of the words in the data item list do not rhyme with any other words in the data item list, and thus are not members of any group:

No Group: able, capture, fish, music, noun, record

For each group of data items, a sublist is generated. For each data item which is a member of a group, the sublist associated with that group includes a sublist entry corresponding to that data item. It is generally desirable in a rhyming dictionary-for words in a group to be displayed in alphabetical order by syllable count. Thus, the sublists are ordered as follows (token numbers are shown in parentheses):

Ordered Sublist 1: base (2), bass (3), trace (12), airspace (1), showcase (11)

Ordered Sublist 2: bass (3), glass (7), underpass (13), fiberglass (5)

The entries in each sublist are preferably identified by their corresponding token values (indicated in parentheses above) arranged in a linked list. Each entry in the ordered sublist includes a pointer to the next entry in that sublist. It can be seen that the ordering of the sublists is not necessarily the same as the ordering of the token values. The last entry in each sublist has a pointer which points to the first entry in the sublist (because of which the sublists are considered to be "circular"). Thus, the two sublists can be represented as follows:

| Entry | Next-Entry Pointer |
|---|---|
| Sublist 1 | |
| base | bass |
| bass | trace |
| trace | airspace |
| airspace | showcase |
| showcase | base |
| Sub list 2 | |
| bass | glass |
| glass | underpass |
| underpass | fiberglass |
| fiberglass | bass |

The two sublists are merged into a single search list. The search list has one entry for each sublist entry. Thus, words which belong to N groups have N corresponding entries in the search list. The search list is ordered by the token value of each of its members. For clarity, the sublist to which each member of the table belongs is indicated in a subscript:

| Table Row | Data Item | Next-Entry Pointer |
|---|---|---|
| 0 | airspace$_1$ (1) | showcase$_1$ (6) |
| 1 | base$_1$ (2) | bass$_1$ (2) |
| 2 | bass$_1$ (3) | trace$_1$ (7) |
| 3 | bass$_2$ (3) | glass$_2$ (5) |
| 4 | fiberglass$_2$ (5) | bass$_2$ (3) |
| 5 | glass$_2$ (7) | underpass$_2$ (8) |
| 6 | showcase$_1$ (11) | base$_1$ (1) |

-continued

| Table Row | Data Item | Next-Entry Pointer |
|---|---|---|
| 7 | trace$_1$ (12) | airspace$_1$ (0) |
| 8 | underpass$_2$ (13) | fiberglass$_2$ (4) |

The word "bass," being a member of two sublists, appears twice in the table. The token value of each data item in the "Data Item" column is again illustrated in parentheses adjacent its associated word. Each row in the search table is identified by a unique table row number, enumerated in the "Table Row" column. The table row number associated with each "Next Data Item" entry is shown in parentheses adjacent each "Next Data Item" word.

Recall that each data item can be identified by its associated token value. A "pre-delta" search list (the meaning of the moniker will be clear shortly) is generated which includes only the token values and the next-data-item values (i.e., the values in parentheses) from the search table, as follows:

| Table Row | Data Item (Token) | Next-Entry Pointer (Row) |
|---|---|---|
| 0 | 1 | 6 |
| 1 | 2 | 2 |
| 2 | 3 | 7 |
| 3 | 3 | 5 |
| 4 | 5 | 3 |
| 5 | 7 | 8 |
| 6 | 11 | 1 |
| 7 | 12 | 0 |
| 8 | 13 | 4 |

A token delta value is then calculated for each entry in the pre-delta search list. The token delta of each row is the difference between the token value of that row and the token value of the previous row. For the first row, the token delta is the value of the token itself. Thus:

| Table Row | Data Item (Token) | Token Delta | Next-Entry Pointer (Row) |
|---|---|---|---|
| 0 | 1 | 1 (= 1) | 6 |
| 1 | 2 | 1 (= 2 − 1) | 2 |
| 2 | 3 | 1 (= 3 − 2) | 7 |
| 3 | 3 | 0 (= 3 − 3) | 5 |
| 4 | 5 | 2 (= 5 − 3) | 3 |
| 5 | 7 | 2 (= 7 − 5) | 8 |
| 6 | 11 | 4 (= 11 − 7) | 1 |
| 7 | 12 | 1 (= 12 − 1) | 0 |
| 8 | 13 | 1 (= 13 − 12) | 4 |

It is clear that the token delta values are generally much smaller than the values of the tokens themselves. This is because the pre-delta search list has been ordered according to the token values, and because a large proportion of the data items are members of one or more sublists.

For the sake of clarity, the token value itself will be referred to hereinafter as an "absolute token," or simply "token," in contradistinction to the "token deltas."

The absolute token value corresponding to each row of the search list is simply the sum of the token deltas on that row and on all previous rows. Thus, to determine the word associated with a row of the search list, one simply adds up the token deltas on that row and all preceding rows to obtain a token value; the token can then be redeemed for its corresponding word by consulting the item list.

The pre-delta search list above is then stored in the memory of an electronic reference product in the following delta format:

| Token Delta | Next-Entry Pointer (Row) |
|---|---|
| 1 | 6 |
| 1 | 2 |
| 1 | 7 |
| 0 | 5 |
| 2 | 3 |
| 2 | 8 |
| 4 | 1 |
| 1 | 0 |
| 1 | 4 |

The storage of small delta values requires much less memory than the storage of larger absolute token values. For example, in an electronic rhyming dictionary including 80,000 lexical words, it is possible to store the token delta values in as little as four bits per row, whereas storage of the absolute token value would require seventeen bits per row. The number of bits needed to store the token deltas is determined by largest token delta value. Where all the words are in at least one sublist, only one bit is needed to store the token deltas.

Figure 4:
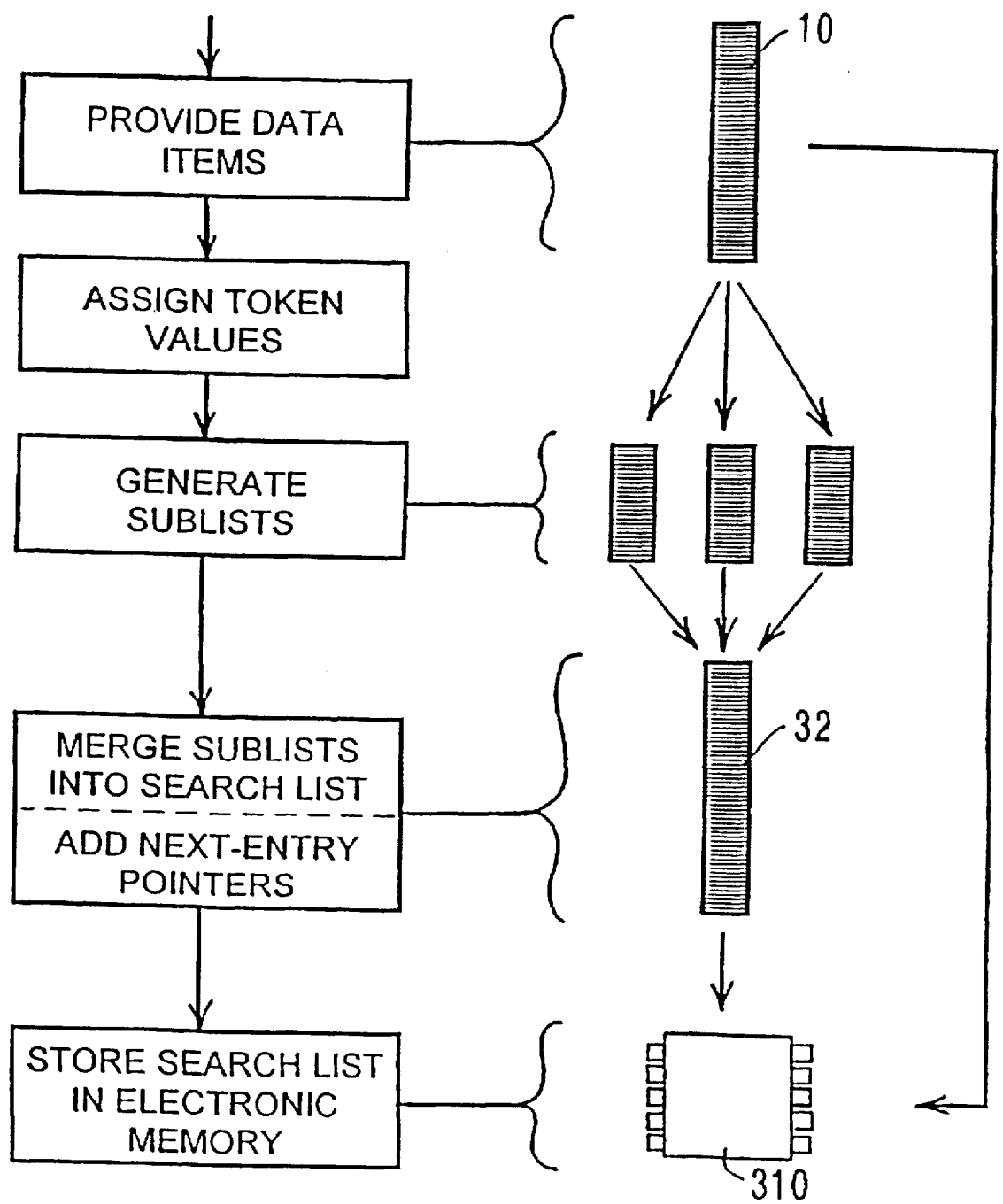
FIG. 4 is a schematic illustration of a method of storing grouped data in an electronic memory.

FIG. 4 provides an overview of the method of storing grouped data in an electronic memory. A collection of data items is provided, and token values are assigned to each item. A sublist is generated for each group of data items. The sublists are merged into a search list, where members of a sublist are linked by next-entry pointers, and the search list and data items are stored in an electronic memory 310.

The "Token Delta" column and the "Next-Entry Pointer" column are preferably compressed and stored separately in the product memory. Of course, a number of different techniques are available for storing the "Token Delta" data and the "Next-Entry Pointer" data. For example, the token data column and next-entry data column may be stored in separate portions of the product memory, and the data from each of the columns may be broken down into a plurality of data segments.

In one of the possible arrangements of data segments which can be used to store token delta and next-entry data, the token delta column is stored as a plurality of segments, each segment including a series of token delta values. Each segment has a base value associated therewith, which may be stored in memory adjacent the segment or, preferably, which may be stored in a separate table of base values. Each base value stores the sum of a plurality of token deltas, thus reducing the number of addition operations that need to be carried out in calculating the absolute tokens from the token deltas in a segment.

In one embodiment, the base value of a segment is equal to the value of the token corresponding to the first entry in that segment. In that case, the token delta of first entry of the segment may optionally be stored as a "zero," since it is not necessary to add the token delta of the first entry. The second absolute token value represented in the segment is then the sum of the base value and the token delta of the second entry.

In another embodiment, the base value of a segment is equal to the sum of all token deltas preceding that segment. In that case, the base value of a segment is equal to the absolute token value of the last search list entry preceding that segment, and the base value of the first segment is zero. The first absolute token value represented in the segment is then the sum of the base value and the token value of the first entry.

In either case, to determine the absolute token value corresponding to a selected search list entry, one calculates the sum of token deltas up to and including the token delta of the selected search list entry, employing a base value where applicable to reduce the number of addition operations that need to be performed.

Because the token delta and the next-entry pointer of a particular data entry may be stored in separate memory locations, those two components are associated by a common index. Thus, where one memory location stores a number of token values in the form of base values and token deltas, and another memory location stores an equal number of next-entry pointers, the $i^{th}$ data entry comprises the $i^{th}$ token delta and the $i^{th}$ next-entry pointer.

The data item list, the token deltas, and the next-entry pointers are together sufficient to provide searchable groupings of the data items. Additional information in the form of "tags" may also be provided. "Tags" are associated either with an entire sublist (group tags), or with individual words within a sublist (word tags).

A word tag can be used to tag a word in a particular group with its definition. For example, in the two sublists of rhyming words, the two senses of the word "bass" can be differentiated with the use of word tags (shown here in parentheses):

Ordered Sublist 1: base, bass (music), trace, airspace, showcase

Ordered Sublist 2: bass (fish), glass, underpass, fiberglass

Group tags can be used, for example, to provide a heading for the sublist. Sublist 1 could be tagged with the heading "'Ace'-Sounding Rhymes". Another use for a group tag is simply to mark the beginning of the sublist.

Group tags are stored in the search table along with the token deltas and next-entry pointers. The untagged data appear as follows:

| Table Row | Token Delta | Next-Entry Pointer |
|---|---|---|
| 0 | 1 (airspace$_1$) | 6 (showcase$_1$) |
| 1 | 1 (base$_1$) | 2 (bass$_1$) |
| 2 | 1 (bass$_1$) | 7 (trace$_1$) |
| 3 | 0 (bass$_2$) | 5 (glass$_2$) |
| 4 | 2 (fiberglass$_2$) | 3 (bass$_2$) |
| 5 | 2 (glass$_2$) | 8 (underpass$_2$) |
| 6 | 4 (showcase$_1$) | 1 (base$_1$) |
| 7 | 1 (trace$_1$) | 0 (airspace$_1$) |
| 8 | 1 (underpass$_2$) | 4 (fiberglass$_2$) |

Group tags are added after the last row of the untagged data table and linked with members of the associated sublist with next-entry pointers. To add a tag to a particular group, it is first decided where in the sublist the tag should be positioned. The group tag is preferably positioned after the last item in the sublist and before the first item in the sublist (recall that the sublists are circular), allowing the tag to mark the location of the beginning of the sublist.

For example, to add a group tag to Sublist 1, a new row 9 is created. The next-entry pointer of the last data item in sublist 1, which is the word "showcase" at Table Row 6, is modified to point to new Row 9. The next-entry pointer of new Row 9 is set to point to the first item in sublist 1, which is the word "base" at Table Row 1. The same procedure may be followed to add a group tag to Sublist 2 at Row 10, resulting in a tagged search table as follows:

| Table Row | Token Delta | Next-Entry Pointer |
|---|---|---|
| 0 | 1 (airspace$_1$) | 6 (showcase$_1$) |
| 1 | 1 (base$_1$) | 2 (bass$_1$) |
| 2 | 1 (bass$_1$) | 7 (trace$_1$) |
| 3 | 0 (bass$_2$) | 5 (glass$_2$) |
| 4 | 2 (fiberglass$_2$) | 10 (group tag) |
| 5 | 2 (glass$_2$) | 8 (underpass$_2$) |
| 6 | 4 (showcase$_1$) | 9 (group tag) |
| 7 | 1 (trace$_1$) | 0 (airspace$_1$) |
| 8 | 1 (underpass$_2$) | 4 (fiberglass$_2$) |
| 9 | — | 1 (base$_1$) |
| 10 | — | 3 (bass$_2$) |

The mere presence of the group tag in each sublist serves a valuable unction by pointing to the location of the first member of the sublist. Group tags are identified by having a row number greater than the last row number of untagged data (in this case, 8). Further information on a sublist may be provided by linking the group tag to additional data. Such information, or a pointer to such information, can in principle be entered in the token delta column itself. However, because each token delta entry preferably takes up only a small number of bits, the amount of information that can be contained therein is limited. Alternatively, group tag information, such as an "'Ace'-Sounding Rhymes" heading for Sublist 1, can be stored in a separate table. Such information can be associated with the search table by the search table row number and may be provided for all or only a portion of group tags.

While, it is preferred, as discussed above, to append group tags at the end of the search table, group tags may be provided at alternative locations in the search table. Preferably, the location of an entry in the search table determines whether or not the entry is a group tag, with a group tag pointer 34 delineating the border between group tags and the remaining entries. More than one group tag may be provided for each group. Indeed, a group tag may be inserted for every word if it is so desired, but the proliferation of group tags tends to result in slower extraction of sublist words.

Word tags may be provided in a separate word tag data table. An example word tag data table includes a first column identifying the row of an entry in the search table and a second column including word tag data, or a pointer to word tag data. The first column may store the row of the search table entry as a delta value, rather than an absolute row value.

A word tag table for the above search table appears as follows:

| Entry List (Table Row) | Word Tag Data |
|---|---|
| 2 | "music" |
| 3 | "fish" |

Word tags may be used instead of group tags to mark the location of the first word in each sublist.

As illustrated in FIG. 1, the memory of an electronic rhyming dictionary includes a data item list 10 and a search list which includes a delta list 12 and a next-entry list 14. A word tag list 16 and word tag data 18 are further included.

The data item list 10 associates a plurality of data items (in this case, English words) with an equal number of unique token values, illustrated in column 20. The words of data item list 20 are preferably stored in a known trie-type data structure, although alternative arrangements of the list may be employed. In any case, it must be possible to locate a data item given that item's token, and to identify a token given the data item.

For the sake of simplicity, only the fourteen words discussed above are shown in data item list 10; it is to be understood that, in a practical version of an electronic rhyming dictionary, the data item list would include a much more substantial number (around 80,000, for example) of English words.

In the discussion above, it was seen that the data item list includes words from two sublists, as well as words which appear in no sublist at all. Each of the data item words which belongs to any group has a corresponding entry in the delta list 12. In one embodiment, the delta list is stored in a plurality of data segments. Such an embodiment is illustrated in FIG. 1, where the delta list 12 is made up of three segments: 22 (the "zeroth" segment), 24 (the first segment), and 26 (the second segment), with four entries per segment.

It is noted at this point that the ordinal adjectives employed herein follow the convention, commonly used with computers, of beginning enumerations with the number "zero". Thus, the "first" item should be taken to mean the item numbered with a "one", despite the fact that the "first" item may be preceded by the "zeroth" item.

Each entry in the search list 32 corresponds to a data item in the data item list 10. The absolute token value of the data item corresponding to any selected search list entry is equal to the sum of all token deltas in delta list 12 up to and including the token delta of the selected search list entry. To limit the number of addition operations that need to be performed to calculate an absolute token value, a base value table 36 is preferably provided to store a subtotal of token delta values. In one embodiment, as illustrated in FIG. 1, the base value table 36 stores the sum of all token deltas preceding the first entry in the segment. Thus, base value table 36 stores base values 0, 3, and 12, which correspond to the sum of token deltas preceding segments 22, 24, and 26, respectively. To determine the absolute token value corresponding to a selected entry in the search list 32, it is necessary only to sum the token deltas from the first entry in the segment through the selected entry, and to add the base value of the segment.

For example, the entry on the seventh line (lines are enumerated for illustration's sake in column 30) of the delta list 12 is in the second segment 24. The base value of the second segment is '3': the sum of all token deltas preceding the second segment (1+1+1+0). To calculate the absolute token value corresponding to line 7, the token deltas from the first entry in segment 24 (line 4) to the selected entry on line 7 are summed (2+2+4+1=9) and added to the base value of segment 24 (9+3=12) to give the absolute token value '12'. As seen in the token column 20, a token value of '12' corresponds to the entry "TRACE". These correspondences are illustrated schematically by lines 28 extending between the delta list 12 and token column 20.

Each entry in delta list 12 has a corresponding entry in the next-entry list 14. This correspondence is preferably established simply by assuring that the number and order of entries in the delta list and the next-entry list are the same. Thus, the $n^{th}$ entry in the delta list is associated with the $n^{th}$ entry in the next-entry list. This relationship is readily preserved even if the delta list and next-entry list are stored and compressed in different memory locations. An entry in the delta list and its corresponding entry in the next-entry list together make up a single entry in the search list 32.

Each entry in the next-entry list 14 points to another entry in the search list 32, identified herein by the line numbers of column 30. The next-entry pointers link, in a circular fashion, all the members of a sublist, including any group tags associated with the sublist. Thus, the zeroth line (airspace) points to the sixth line (showcase), which points to the ninth line (group tag), which points to the first line (base), which points to the second line (bass), which points to the seventh line (trace), which points, at last, back to the zeroth line.

It is clear from this jaunt through the search list that the order of words as they appear in a group is not necessarily the same as the order of their token values. Instead, the entries in the search list 32 are arranged by the order of the tokens of their associated data items, as seen in FIG. 1 by the fact that none of lines 28 cross one another. The practical benefits of this arrangement are that the difference between token values associated with consecutive lines in the search table 32 is consistently small, resulting in small delta values which occupy a minimum of electronic memory space, and that the search list can be searched using a binary search function.

In general, the fewer the number of data items which do not belong to any sublist, the smaller the token deltas are, and the less memory they require. Each token delta in delta list 12 is simply the difference between the token value of the associated item and the token value of the preceding item in the item list which belongs to at least one sublist. For an electronic rhyming dictionary, the distance between tokens which belong to one sublist or another is rarely very large, since nearly every word rhymes with at least one other word.

Although memory space could be preserved by deleting all of the data items which do not belong to any sublist, retaining those items has a valuable utility. When a user of the electronic rhyming dictionary enters a search word to find associated rhymes, and no rhymes are found, it is helpful for the user to be informed whether the search word itself is unknown to the dictionary, or whether the search word is known but no rhymes are stored in the dictionary. Consider an item list which includes the common word "ORANGE" but not the less common term "BASQUE." In either case, the search list would fail to turn up any rhymes. In the case of "ORANGE," the user is notified that the word is included in the item list, but that no rhymes were found. In the case of "BASQUE," on the other hand, the user is notified that the word was not in the item list, thus preventing the user from being misled into believing that no common words rhyme with "BASQUE." This notification is also useful where a user has simply misspelled a word.

Data item words with or without a correspondent in the search list 32 may be useful in word or group tags. Word tag list 16, for example, identifies (using the line number from the search list, though delta compression may also be used) those entries in the search table which have word tags. Data corresponding to the word tags is stored in word tag data list 18. The word tag data includes token numbers for words which make up the word tag. Each of the search list entries corresponding to the word "BASS" has a word tag. The tag corresponding to the first BASS entry includes the token numbers "9,8". Decoding the token numbers results in the tag "NOUN, MUSIC," i.e., the definition corresponding to the "-ace" pronunciation of BASS. Likewise, the tag corresponding to the second BASS entry is decoded as "NOUN, FISH," corresponding to the "-ass" pronunciation of BASS.

Various alternative formats for the word tag data are conceivable. For example, the word tag data may be a pointer to a string of tokens or a string of text. Or, word tag data list 18 may be eliminated altogether, with the mere presence of an entry in word tag list 16 serving a function, such as marking the first word in a sublist. Where all or nearly all of the entries in the search table 32 have word tag data, the word tag data list 18 is provided with one entry for each entry in the search list 32. The word tag data entries and the search table entries are then no longer associated through a tag list 18, but rather by sharing a common index. That is, the n*th* entry in the search list is tagged with data from the n*th* entry in the word tag data 18. The word tag list 16 may then be eliminated.

As noted above, the search list 32 includes group pointers. Group pointers are distinguished from entries which correspond to data items by a group tag pointer 34, which marks the beginning of the group tags. Entries whose positions in the search list 32 follow the position pointed to by the group tag pointer are automatically designated as group tags. As seen in search list 32, the group tags following group tag pointer 34 have been given token delta values of zero. Because the group tags are not associated with any one data item in the sense that the other entries in the search list are, the delta values of group tags are not used to calculate an associated token value. Indeed, they are not necessarily used for anything at all. They could be used, however, if so desired, to contain useful data, or, more practically, to contain a pointer to useful data.

Figure 2:
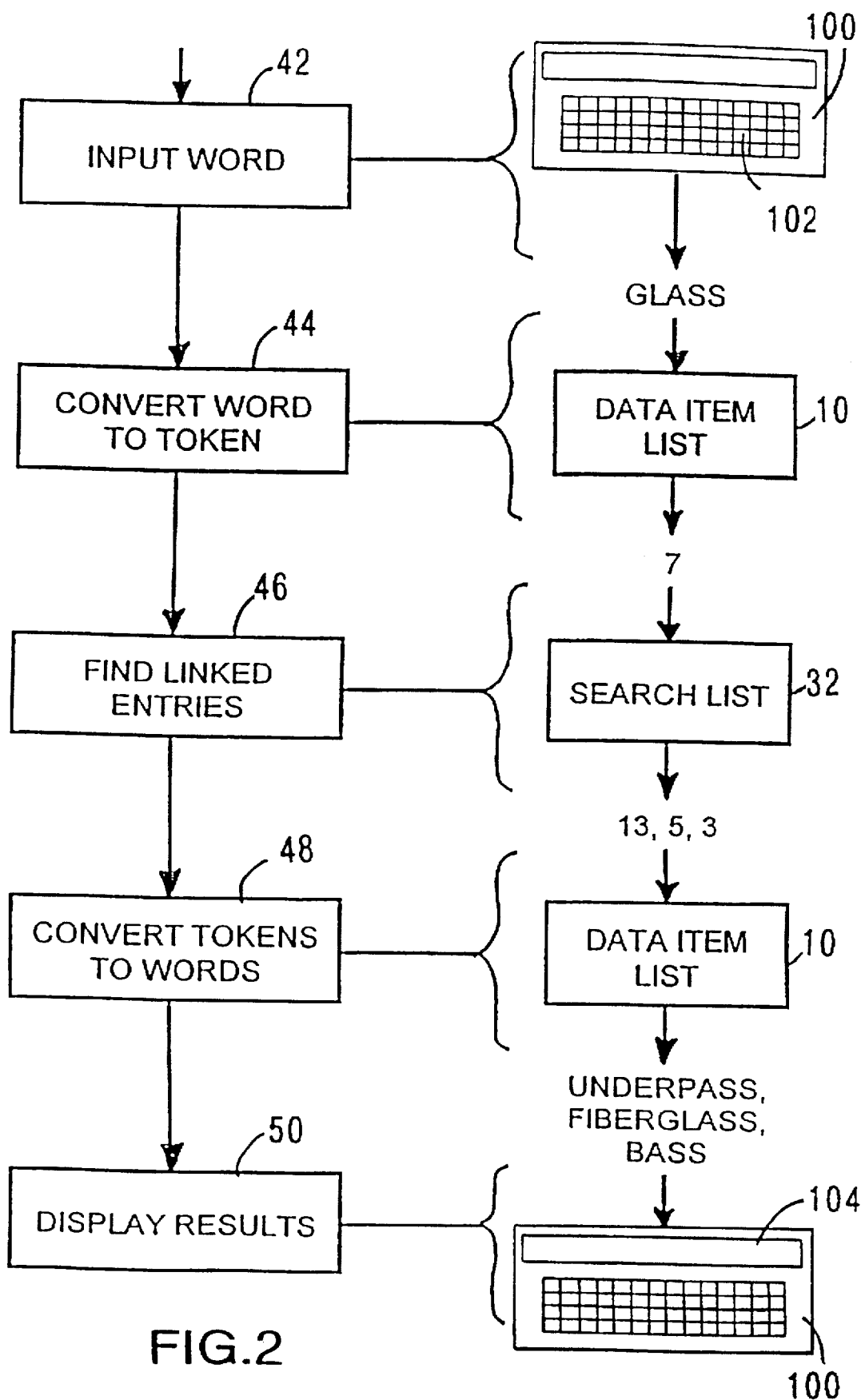
FIG. 2 is a schematic illustration of a method of accessing all members of a group of data items in response to a user input of one member of the group being accessed.

An overview of the operation of a hand-held electronic reference product, such as an electronic rhyming dictionary 100 is set forth in FIG. 2. In an initial step 42, a user inputs a search word through a keypad 102 of electronic dictionary 100. The user of FIG. 2, for example, has entered the term "GLASS." The electronic dictionary 100 includes a data bank which stores data item list 10. The electronic dictionary consults the data item list to convert the word ("GLASS") to its corresponding token ("7"). The user is notified if the word he entered is not included in the data item list.

In step 44, the search list 32 in the memory of the electronic dictionary is searched using a binary search to find one or more entries corresponding to the token of the search word (the "search token") and subsequently to find each of the entries linked to the search token. The words identified by the tokens associated with the linked entries ("13", "5", and "3") are found in step 48 by again consulting the data item list 10. The resulting words ("UNDEPASS", "FIBERGLASS", and "BASS") are then displayed in step 50 on an LCD display 104 of the electronic dictionary 100.

Step 46, finding linked entries, is considered here in further detail, with reference again to FIG. 1. Once the search token is obtained in step 44, the search table entry or entries corresponding to the search token are located. This operation is performed particularly quickly since a binary search is used on search table 32, and all search table entries which correspond to the search token are adjacent in the search table. Thus, where the search token is "3", for "BASS," the electronic reference product 100 finds an occurrence of token "3" at the search table entry numbered "2". Since all entries associated with the token "3" are adjacent in the search table are adjacent, the reference product 100 simply checks neighboring entries to see whether they correspond to the same token. A set of neighboring entries which correspond to a common token make up a common set. The first entry in the common set has a non-zero token delta, while all subsequent entries in the common set have a token delta of zero.

With the first occurrence of the token "3" (BASS) found on the second line, the reference product 100 checks the third line for another occurrence of the token "3". Finding a zero in the third line of the delta list, the reference product notes that the third line is also associated with the token "3". The reference product then checks the fourth line and finds the token delta value "2", indicating that the entry on the fourth line is associated with the token "5" (3+2), and not the token "3". Having found two entries corresponding to the search token 3, the reference product stops counting.

A savings in execution time results from the fact that, once one search list entry corresponding to the search token is found, any additional corresponding entries are known to be adjacent, so it is not necessary for reference product 100 to read through the entire search list 32 to find any other corresponding entries.

A search for entries in the search table corresponding to a search token is preferably a binary search. In a binary search, a search list entry approximately in the middle of the search list is tested against the search token. Either a match (i.e., a corresponding entry) is found, or the token value of the tested entry is higher or lower than the search token. If the tested token is higher than the search token, the tested token and all subsequent tokens are excluded from the search. Likewise, if the tested token is lower than the search token, the tested entry and all previous entries are excluded from the search. The process is repeated, testing a search list entry approximately in the middle of the remaining search tokens, until a matching token is found (or until all entries are excluded without a match). Again, to obtain all matching tokens, it is not necessary to repeat the binary search process since, once a single matching token is found, any other matching tokens are known to be adjacent. The process of binary searching is described in further detail in D. E. Knuth, "The Art of Computer Programming," vol. 3, "Sorting and Searching," (Reading: Addison-Wesley, 1973), 406–412, incorporated herein by reference. One example of a binary search function is the C function "bsearch" in the standard C library.

In an exemplary embodiment, reference product 100 displays on screen 104 the number of matching entries. For example, after a search on the word "BASS" (token "3"), the screen 104 displays text such as "2 HITS" to notify the user that the term "BASS" is in two sublists, i.e., two different sets of rhyming words.

Various techniques may be employed for handling cases such as "BASS" where the search term is a member of more than one sublist. One such technique displays word tag data for each entry and allows a user to select one of the sublists. For example, the text "BASS: NOUN, MUSIC" and "BASS: NOUN, FISH" may be displayed, and the user can select one or the other. Likewise, the user can be presented with group tag data corresponding to the sublists of the respective entries. Alternatively, the reference product 100 simply retrieves the linked entries for all of the matching entries in turn, subsequently allowing the user to scroll or page through the results. The handling of multiple entries is discretionary; in any case, once a matching entry is selected, be it a unique matching entry or one of several, the reference product 110 then finds the entries from the same sublist as the selected matching entry.

The linked entries are located by starting with the matching entry and following the next-entry pointers to a group tag. An entry is identified as a group tag by appearing in the search list 32 in a position after the position pointed to by the group tag pointer 34. For example, in FIG. 1, the group tag pointer may store the value "9", indicating that entries in the ninth and subsequent lines are group tags.

Once the group tag has been reached, indicating the start of the group, the next-entry pointers are again followed until the group tag is reached a second time. From the start of the group (the first encounter with the group tag), the token value associated with each entry is calculated and stored.

The retrieved token values associated with the linked entries are converted into data item words by consulting the data item list 10. This conversion may be performed after all of the linked entries have been found, or each time a single linked entry is found.

For each linked entry, the reference product searches the word tag list 16 for a corresponding entry. If a linked entry has a corresponding word tag, the word tag data 18 is displayed along with the word.

In a less sophisticated embodiment, no group tag is employed to mark the start of a group. Starting with the matching entry, the next-entry pointers are followed until the matching entry is reached once again.

While the invention has been described in detail with the example of a rhyming dictionary, the techniques described herein are equally useful for retrieving other groupings of data items. For example, grouping words by their definitions is useful in an electronic thesaurus. Synonyms are grouped into sublists and are linked in a circular fashion by next-entry pointers. Words with more than one meaning belong to more than one group and have more than one entry in the search list. In an exemplary embodiment, word tags provide the definitions of their associated words, but only the word tag data for the search word is displayed. The definitions (i.e., the word tag data) of linked words may be displayed upon request by a user.

Figure 3:
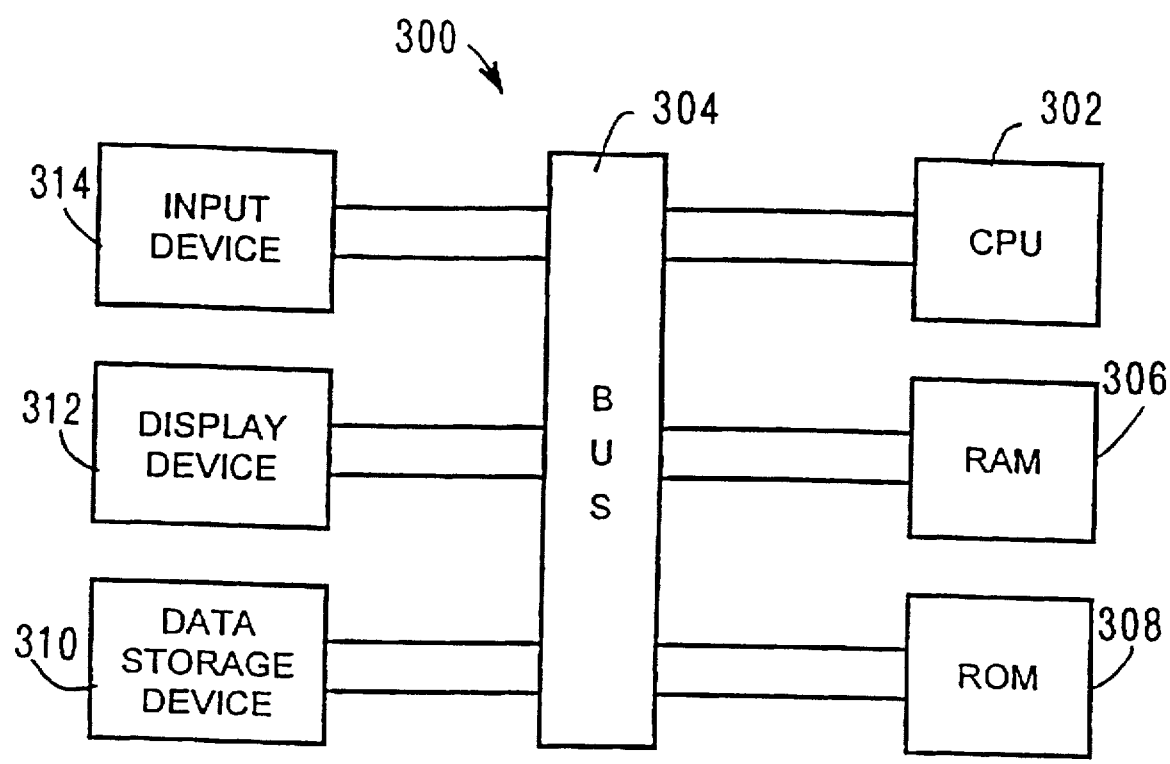
FIG. 3 is a schematic illustration of computer circuitry useful in the present invention.

The design of a special purpose computer or the programming of a general purpose computer to store the data and to carry out the procedures described in the present disclosure is a straightforward exercise of ordinary skill in the pertinent art. As illustrated in FIG. 3, the invention can be carried out on a computer system 300. Computer 300 includes a central processing unit 302 communicating over a bus 304 with RAM memory 306 and ROM memory 308. A data storage device 310, such as a disk drive or a removable or non-removable ROM card may also be provided. The computer 300 further includes a display device 312, such as an LCD or CRT screen, and an input device 314, such as a keypad. The data item list 10, search list 32, word tag list 16, word tag data 18, and group tag pointer 34 may each be stored in any one of the electronic memories: RAM 306, ROM 308, and data storage device 310. Likewise, a computer program to operate computer 300 may be stored in any of those electronic memories.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. An electronic reference device providing the ability to access all members of any one of a plurality of groups of data items in response to a user input of any one member of the group being accessed, comprising:

a memory having a data item list, a token uniquely identifying each member of said data item list, a plurality of groups of said data item list, certain members of said data item list being a member of one or more of said groups and certain members of said date item list being a member of none of said groups, an ordered search list consisting of each member of said data item list which is a member of at least one of said groups, a delta value associated with each member of said ordered search list, the sum of said delta values up through any one of said members of said ordered search list providing the value of said token for the corresponding member of said data item list, each member of said search list having a next-entry pointer identifying another member of said search list, all members of said search list that are linked by a set of inter-connecting next-entry pointers corresponding to members of said data item list from the same one of said groups.

2. The electronic reference device of claim 1 wherein:

certain members of said data item list are a member of multiple ones of said groups, and each member of said data item list that is a member of multiple groups is listed only once in said data item list and has a single token.

3. The electronic reference device of claim 2 wherein:

each item that is a member of multiple groups is represented by a number of consecutive entries in said search list equal to the number of groups of which said item is a member, the ones of said consecutive entries in said search list which correspond to a single item on said item list constituting a common set on said search list, the first member of any one of said common sets having a delta value appropriate to the corresponding member of said data item list, the rest of the members of that common set having a delta value of zero.

4. The electronic reference device of claim 1 wherein:

each member of said data item list that is not a member of any of said groups is unrepresented in said search list.

5. The electronic reference device of claim 1 wherein:

each member of said search list is identified by one and only one next-entry pointer.

6. An electronic reference device providing the ability to access all members of any one of a plurality of groups of data items in response to a user input of any one member of the group being accessed, comprising:

a memory having a data item list, a token uniquely identifying each member of said data item list, a plurality of groups of said data item list, certain members of said data item list are a member of multiple ones of said groups, each member of said data item list that is a member of multiple groups being listed only once in said data item list and has a single token.

an ordered search list consisting of each member of said data item list which is a member of at least one of said groups, a delta value associated with each member of said ordered search list, the sum of said delta values up through any one of said members of said ordered search list providing the value of said token for the corresponding member of said data item list, each member of said search list having a next-entry pointer identifying another member of said search list, all members of said search list that are linked by a set of inter-connecting next-entry pointers corresponding to members of said data item list from the same one of said groups.

7. The electronic reference device of claim 6 wherein:

certain members of said data item list are a member of none of said groups, each member of said data item list that is not a member of any of said groups being unrepresented in said search list.

8. The electronic reference device of claim 6 wherein each member of said data item list that is a member of multiple groups is listed only once in said data item list and has a single token.

9. The electronic reference device of claim 8 wherein:

each item that is a member of multiple groups is represented by a number of consecutive entries in said search list equal to the number of groups of which said item is a member, the ones of said consecutive entries in said search list which correspond to a single item on said item list constituting a common set on said search list, the first member of any one of said common sets having a delta value appropriate to the corresponding member of said data item list, the rest of the members of that common set having a delta value of zero.

10. The electronic reference device of claim 6 wherein:

each member of said search list is identified by one and only one next-entry pointer.

11. An electronic reference device providing the ability to access all members of any one of a plurality of groups of data items in response to a user input of any one member of the group being accessed, comprising:

a memory having a data item list, a token uniquely identifying each member of said data item list, a plurality of groups of said data item list, certain members of said data item list being a member of one or more of said groups and certain members of said data item list being a member of none of said groups, each member of said data item list that is a member of multiple groups being listed only once on said data item list and having a single token, an ordered search list consisting of each member of said data item list which is a member of at least one of said groups, each member of said data item list that is not a member of any of said groups being unrepresented in said search list, a delta value associated with each member of said ordered search list, the sum of said delta values up through any one of said members of said ordered search list providing the value of said token for the corresponding member of said data item list, each member of said search list having a next-entry pointer identifying another member of said search list, each member of said search list being identified by one and only one next-entry pointer, all members of said search list that are linked by a set of inter-connecting next-entry pointers corresponding to members of said data item list from the same one of said groups, each item that is a member of multiple groups being represented by a number of consecutive entries in said search list equal to the number of groups of which said item is a member, the ones of said consecutive entries in said search list which correspond to a single item on said item list constituting a common set on said search list, the first member of any one of said common sets having a delta value appropriate to the corresponding member of said data item list, the rest of the members of that common set having a delta value of zero.

12. An electronic reference product for accessing linked data, comprising:

a data item memory storing a plurality of data items, the data item memory associating each of the data items with a unique token value;

a search list memory including a plurality of ordered search list entries, each search list entry having a token value associated therewith, the order of the search list entries being the same as the order of the respective associated token values, each search list entry having a next-entry pointer identifying a linked search list entry, each of the token values associated with a search list entry being equal to a token value of a corresponding data item;

a plurality of the search list entries including a delta value, the delta value being the difference between the value of the associated token and the value of the token associated with the preceding data entry;

at least one base value, each base value storing a token value corresponding to a search list entry;

means for accessing the data item memory to determine a search token associated with a data item input by a user;

means for searching the search list to find a matching search list entry corresponding to the search token;

means for accessing the search list to find a linked search list entry identified by the next-entry pointer of the matching search list entry;

means for accessing the search list to calculate a linked token value associated with the linked search list entry;

means for accessing the data item memory to determine a linked data item associated with the linked token value; and means for displaying the linked data item.

13. The electronic reference product of claim 12 wherein each search list entry is a member of a sublist, members of a common sublist being linked by the next-entry pointers of their respective members.

14. The electronic reference product of claim 13 wherein each data item which corresponds to a search list entry is a member of a group, each sublist being associated with a group, each member of a group having a corresponding search list entry in the associated sublist.

15. The electronic reference product of claim 14 wherein each data item is a lexical word.

16. The electronic reference product of claim 15 wherein each group is a group of rhyming lexical words.

17. The electronic reference product of claim 15 wherein each group is a group of synonyms.

18. The electronic reference product of claim 14 wherein all search list entries which correspond to data items in a common group are linked by the next-entry pointers of the search list entries in a circular fashion.

19. The electronic reference product of claim 14 wherein the number of groups of which each respective data item is a member is equal to the number of search list entries corresponding to the respective data item.

20. The electronic reference product of claim 19 wherein search list entries which correspond to a common data item are adjacent in the search list.

21. The electronic reference product of claim 14, wherein the search list memory further includes at least one group tag entry associated with a tagged sublist, the group tag entry being linked to the tagged sublist by the next-entry pointer of an entry in the tagged sublist.

22. The electronic reference product of claim 21, wherein the group tag entry and the sublist members in the associated tagged sublist are linked by the next-entry pointers thereof in a circular fashion.

23. The electronic reference product of claim 12, wherein the means for searching the search list includes means for performing a binary search on the search list.

24. The electronic reference product of claim 12 further comprising a word tag memory, the word tag memory including a plurality of word tag entries, each word tag entry including a word tag and associated word tag data, each word tag identifying an entry in the search list.

25. The electronic reference product of claim 12, further comprising a base value memory for storing each base value.

26. An electronic memory for use with an electronic reference product providing the ability to access all members of any one of a plurality of groups of data items in response to a user input of any one member of the group being accessed, the memory comprising:
  a data item memory storing a plurality of data items, the data item memory associating each of the data items with a unique token value;
  a search list memory including a plurality of ordered search list entries, each search list entry having a token value associated therewith, the order of the search list entries being the same as the order of the respective associated token values, each search list entry having a next-entry pointer identifying a linked search list entry, each of the token values associated with a search list entry being equal to a token value of a corresponding data item;
  a plurality of the search list entries including a delta value, the delta value being the difference between the value of the associated token and the value of the token associated with the preceding search list entry; and
  at least one base value, each base value storing a token value corresponding to a search list entry;
  the next-entry pointers being selected such that the data item corresponding to each search list entry is in a common group with the data item corresponding to the respective linked search list entry.

27. The electronic memory of claim 26 wherein each search list entry is pointed to by one and only one next-entry pointer.

28. The electronic memory of claim 26 wherein the data items are lexical words.

29. The electronic memory of claim 28 wherein the groups are groups of rhyming words.

30. The electronic memory of claim 28 wherein the groups are groups of synonyms.

31. An electronic memory for use with an electronic reference product providing the ability to access all members of any one of a plurality of groups of data items in response to a user input of any one member of the group being accessed, the memory comprising:
  a data item memory storing a plurality of data items, the data item memory associating each of the data items with a unique token value;
  a search list memory including a plurality of ordered search list entries, each search list entry having a token value associated therewith, the order of the search list entries being the same as the order of the respective associated token values, each search list entry having a next-entry pointer identifying a linked search list entry, each of the token values associated with a search list entry being equal to a token value of a corresponding data item;
  a plurality of the search list entries including a delta value, the delta value being the difference between the value of the associated token and the value of the token associated with the preceding search list entry;
  at least one base value, each base value storing a token value corresponding to a search list entry;
  a first program memory for determining a search token associated with a data item input to an electronic reference product by a user;
  a second program memory for searching the search list to find a matching search list entry corresponding to the search token;
  a third program memory for accessing the search list to find a linked search list entry identified by the next-entry pointer of the matching search list entry;
  a fourth program memory for accessing the search list to calculate a linked token value associated with the linked search list entry;
  a fifth program memory for accessing the data item memory to determine a linked data item associated with the linked token value; and
  a sixth program memory for directing the electronic reference product to display the linked data item.

32. The electronic reference product of claim 31 wherein each search list entry is a member of a sublist, members of a common sublist being linked by the next-entry pointers of their respective members.

33. The electronic reference product of claim 32 wherein each data item which corresponds to a search list entry is a member of a group, each sublist being associated with a group, each member of a group having a corresponding search list entry in the associated sublist.

34. The electronic reference product of claim 33 wherein each data item is a lexical word.

35. The electronic reference product of claim 34 wherein each group is a group of rhyming lexical words.

36. The electronic reference product of claim 34 wherein each group is a group of synonyms.

37. The electronic reference product of claim 33 wherein all search list entries which correspond to data items in a common group are linked by the next-entry pointers of the search list entries in a circular fashion.

38. The electronic reference product of claim 33 wherein the number of groups of which each respective data item is a member is equal to the number of search list entries corresponding to the respective data item.

39. The electronic reference product of claim 38 wherein search list entries which correspond to a common data item are adjacent in the search list.

40. The electronic reference product of claim 33, wherein the search list memory further includes at least one group tag entry associated with a tagged sublist, the group tag entry being linked to the tagged sublist by the next-entry pointer of an entry in the tagged sublist.

41. The electronic reference product of claim 40, wherein the group tag entry and the sublist members in the associated tagged sublist are linked by the next-entry pointers thereof in a circular fashion.

42. The electronic reference product of claim 31, wherein the second program memory for searching the search list includes means for performing a binary search on the search list.

43. The electronic reference product of claim 31 further comprising a word tag memory, the word tag memory including a plurality of word tag entries, each word tag entry including a word tag and associated word tag data, each word tag identifying an entry in the search list.

44. The electronic reference product of claim 31, further comprising a base value memory for storing each base value.

* * * * *